United States Patent
Kotos

(10) Patent No.: US 8,144,250 B2
(45) Date of Patent: Mar. 27, 2012

(54) MICROCONTROLLER-BASED MULTI-FORMAT VIDEO AGC/SYNC LOOP REGULATOR

(76) Inventor: John Louis Kotos, Blue Island, IL (US)

( * ) Notice: Subject to any disclaimer, the term of this patent is extended or adjusted under 35 U.S.C. 154(b) by 1337 days.

(21) Appl. No.: 11/807,543

(22) Filed: May 29, 2007

(65) Prior Publication Data

US 2008/0151114 A1 Jun. 26, 2008

Related U.S. Application Data

(60) Provisional application No. 60/877,194, filed on Dec. 26, 2006.

(51) Int. Cl.
*H04N 5/08* (2006.01)

(52) U.S. Cl. ................ 348/528; 348/533; 348/534

(58) Field of Classification Search .......... 348/501, 348/558, 536, 540, 542, 547, 528, 533, 534, 348/678, 691, 695, 696, 685; 386/201, 207; 380/221, 225, 204
See application file for complete search history.

(56) References Cited

U.S. PATENT DOCUMENTS

| | | | | |
|---|---|---|---|---|
| 4,695,901 A * | 9/1987 | Ryan | | 380/204 |
| 5,459,526 A * | 10/1995 | Yamada | | 348/555 |
| 5,815,213 A * | 9/1998 | Meunier | | 348/533 |
| 5,844,622 A * | 12/1998 | Hulvey | | 348/546 |
| 5,953,069 A * | 9/1999 | Bruins et al. | | 348/525 |
| 6,154,256 A * | 11/2000 | Bruins | | 348/533 |
| 6,441,860 B1 * | 8/2002 | Yamaguchi et al. | | 348/555 |
| 7,110,042 B1 * | 9/2006 | Bradley | | 348/534 |
| 7,443,455 B2 * | 10/2008 | Nave | | 348/678 |

* cited by examiner

*Primary Examiner* — Victor Kostak

(57) ABSTRACT

A microcontroller-based video AGC/sync regulator in which the parameters of various synchronizing signals of several different video formats are incorporated into a user program to generate signals to be processed by other sub circuits that correct and reinforce the AGC levels and sync signals of an incoming video signal is disclosed. The microcontroller-based video AGC/sync regulator is synchronized by the selection and isolation of a reference point of particular qualities that distinguishes itself from any other portion of the video signal. The reference points may be singular or plural in nature and are extracted from the video signal by means of a hybrid and specialized circuit or circuits, an auxiliary microcontroller and/or the system microcontroller. The microcontroller-based AGC/sync regulator is readily adapted for use as a decoder/encoder by altering the user program.

7 Claims, 13 Drawing Sheets

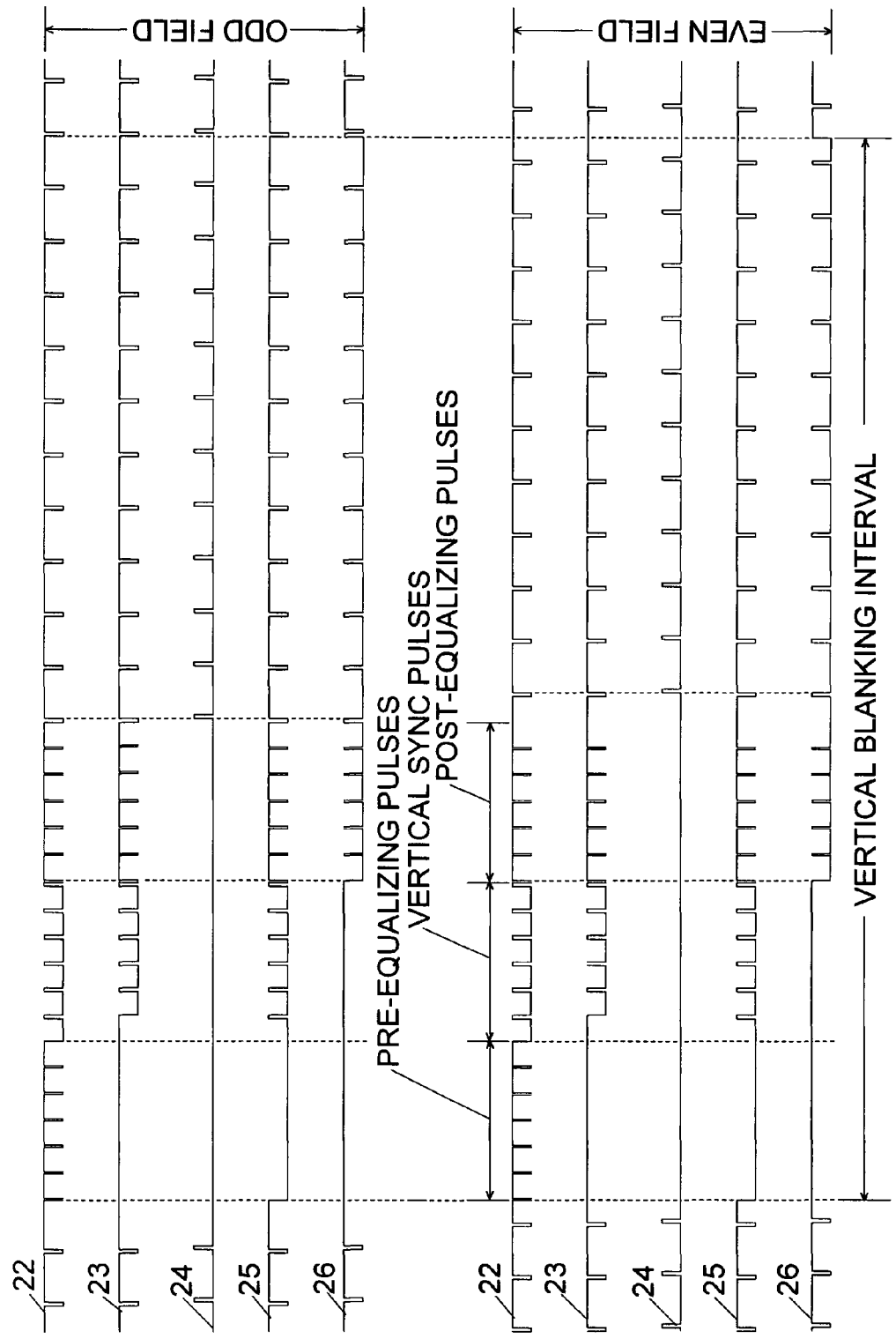

MICROCONTROLLER-BASED MULTI-FORMAT VIDEO AGC/SYNC LOOP REGULATOR

CROSS-REFERENCE TO RELATED APPLICATIONS

This invention is related to Provisional Patent Application No. 60/877,194 which filed on Dec. 26, 2006.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates to a method and apparatus for video signal processing. More particularly, it relates to assuring video signal format integrity for the recording, transmission and viewing of a video signal by reestablishing proper video AGC and sync parameters.

Various methods and apparatus have been developed and incorporated for modifying a video signal by the introduction and/or replacement of sync pulses in a manner to allow normal viewing by a television receiver, but preventing the making of a recording acceptable for viewing. U.S. Pat. No. 4,100,575 entitled "METHOD AND APPARATUS FOR MODIFYING A VIDEO SIGNAL TO PREVENT UNAUTHORIZED RECORDING AND REPRODUCTION THEREOF" which issued on Jul. 11, 1978 to Minoru Morio et al discloses a process of replacing a portion of vertical pulses with equalizing pulses in some of the vertical blanking intervals. U.S. Pat. No. 4,631,603 entitled "METHOD AND APPARATUS FOR PROCESSING VIDEO SIGNALS SO AS TO PROHIBIT THE MAKING OF ACCEPTABLE VIDEO TAPE RECORDINGS" which issued on Dec. 23, 1986 to John O. Ryan discloses a process by which ordered pairs of pseudo-sync pulses and white pulses are added during the vertical blanking intervals and interfere with a VCR's recording and AGC circuitry. The white or positive pulses would correspond to incorrect AGC levels. U.S. Pat. No. 4,819,098 entitled "METHOD AND APPARATUS FOR CLUSTERING MODIFICATIONS MADE TO A VIDEO SIGNAL TO INHIBIT THE MAKING OF ACCEPTABLE VIDEOTAPE RECORDINGS" which issued on Apr. 4, 1989 to John O. Ryan discloses another method and apparatus for adding a plurality of positive pulses to the video signal with each immediately following a respective trailing edge of a normally occurring sync pulse. These added pulses are clustered at the vertical blanking interval of each field and interferes with the automatic level control circuit of a recording device. U.S. Pat. No. 6,836,549 B1 entitled "METHOD AND APPARATUS FOR SYNTHESIZING AND REDUCING THE EFFECTS OF VIDEO COPY PROTECTION SIGNALS" which was issued on Dec. 28, 2004 to Ronald Quan et al discloses a method and apparatus for defeating copy protection signals in a video signal, and also for providing copy protection signals for a video signal. The defeat method generally utilizes a particular pulse position shifting, modulation, etc., of AGC, normal sync and/or pseudo sync pulses to increase the separation between the pulses and the copy protection method includes various embodiments for dynamically varying the sync/pseudo sync and AGC separation. U.S. Pat. No. 7,087,380 B2 entitled "METHOD FOR MODIFYING A COPY PROTECTED VIDEO SIGNAL WITH A NEGATIVE AMPLITUDE PULSE" issued on Aug. 1, 2006 to Ronald Quan discloses an enhancement to existing copy protected signals by the addition of negative amplitude pulses to the video signal at a location in the horizontal blanking interval "back porch" after the color burst.

There are methods and apparatus that have been developed and incorporated for detection and subsequent neutralization of these video signal modifications. U.S. Pat. No. 4,695,901 entitled "METHOD AND APPARATUS FOR REMOVING PSEUDO-SYNC AND/OR AGC PULSES FROM A VIDEO SIGNAL" which issued on Sep. 22, 1987 to John O. Ryan discloses a selectively-operable clipping circuit used to remove pseudo-sync pulses from a video signal, while added AGC pulses are effectively blanked from a video signal with an electrically-operable switch. U.S. Pat. No. 5,157,510 entitled "METHOD AND APPARATUS FOR DISABLING ANTI-COPY PROTECTION SYSTEM IN VIDEO SIGNALS USING PULSE NARROWING" which issued on Oct. 20, 1992 to Ronald Quan discloses a method and apparatus that effectively increases the high-frequency content of the pseudo-sync and/or AGC pulses. This renders the pulses susceptible to attenuation and/or low-pass filtering in the VCR circuitry to counteract the effectiveness of the pulses in preventing copying. U.S. Pat. No. 5,194,965 entitled "METHOD AND APPARATUS FOR DISABLING ANTI-COPY PROTECTION SYSTEM IN VIDEO SIGNALS" which issued on Mar. 16, 1993 to Ronald Quan et al discloses a method and apparatus for altering the level of the video signal during the vertical blanking interval, e.g., level-shifting, so as to render the copy-protect signals ineffective to prevent unauthorized copying by a VCR. An alternative method includes increasing the effective frequency of the copy-protect signals during the vertical blanking interval so as to achieve attenuation and/or low-pass filtering in the VCR circuitry to counteract the effectiveness of the signals in preventing copying. U.S. Pat. No. 5,625,691 entitled "METHOD AND APPARATUS TO DEFEAT CERTAIN COPY PROTECTION PULSES WITHIN A VIDEO SIGNAL" which issued on Apr. 29, 1997 to Ronald Quan, U.S. Pat. No. 5,633,927 entitled "VIDEO COPY PROTECTION PROCESS ENHANCEMENT TO INTRODUCE HORIZONTAL AND VERTICAL PICTURE DISTORTIONS" which issued on May 27, 1997 to John O. Ryan et al and U.S. Pat. No. 5,748,733 entitled "METHOD AND APPARATUS TO REDUCE THE EFFECTS OF CERTAIN COPY PROTECTION PURSES WITHIN A VIDEO SIGNAL" which issued on May 5, 1998 to Ronald Quan each disclose several modifications to a video signal that are added to the existing basic anti-copy signals of pseudo-sync and/or AGC pulses thus the enhancement of the anti-copy system. One of these enhancements involves the introduction of signals into the overscan portion of the video signal in order to trigger an early horizontal or vertical retrace. Another enhancement is the narrowing of selected horizontal sync signals. Others enhancements are also disclosed. Methods and apparatus to remove these enhancing modifications include level shifting and sync widening. U.S. Pat. No. 6,002,830 entitled "METHOD AND APPARATUS FOR REMOVING OR DEFEATING EFFECTS OF COPY PROTECTION SIGNALS FROM A VIDEO SIGNAL" which issued on Dec. 14, 1999 to Ronald Quan and U.S. Pat. No. 6,421,497 entitled "METHOD FOR LOCATING COPY PROTECTION PULSES WITHIN SELECTED VIDEO LINES OF A VIDEO SIGNAL" which issued on Jul. 16, 2002 to Ronald Quan each disclose a method and apparatus for detection of copy protection pulses using the color burst signal or chroma in the horizontal blanking interval then modifying the video signal so as to render it recordable. These modifications include gain-shifting portions of the video signal, level-shifting portions of the video signal, bandwidth limiting certain portions of the video signal or replacing certain portions of the video signal with other video elements. U.S. Pat. No. 6,501,842 B2 entitled "METHOD AND APPARATUS FOR MODIFYING A VIDEO SIGNAL BY BACK PORCH LOWERING" which issued on Dec. 31, 2002 to Ronald Quan discloses a method and apparatus that replaces or level shifts portions of a video signal to defeat the effects of copy protection signals.

Methods and apparatus have been developed to aid and/or impair the detection of synchronizing signals necessary for the reconstitution of altered video signals. U.S. Pat. No. 4,571,615 entitled "TIMING GENERATOR FOR SYNC SUPPRESSED TELEVISION SIGNALS" which issued Feb. 18, 1986 to Clyde Robbins et al discloses a device which detects the absence and the first reoccurrence of the color burst signal to generate a synchronizing signal. U.S. Pat. No. 4,684,988 entitled "CIRCUIT ARRANGEMENT FOR DETECTING THE VERTICAL BLANKING PERIODS IN A PICTURE SIGNAL" which was issued on Aug. 4, 1987 to Kurt J. Johannes discloses a circuit for detecting the blanking period in a picture signal, having a pulse interval detector and a subsequent pulse shaping stage. U.S. Pat. No. 5,034,981 entitled 'ANTI-COPYING VIDEO SIGNAL PROCESSING" issued Jul. 23, 1991 to Eugene Leonard et al discloses a method and apparatus that disrupts digital vertical synchronizing circuit operation. U.S. Pat. No. 5,179,452 entitled "METHOD FOR PRODUCING COPY PROTECTED RECORDED VIDEOTAPE HAVING UNCOPYABLE VERTICAL SYNCHRONIZING SIGNAL PARTITION" which was issued Jan. 12, 1993 to Yasunori Takahashi disclose a method of altering the vertical sync pulses in order to disrupt the operation of a videotape recorder. U.S. Pat. No. 6,931,547 B2 entitled "METHOD AND APPARATUS FOR IDENTIFYING A VERTICAL BLANKING INTERVAL IN A TELEVISION SIGNAL" which was issued on Aug. 16, 2005 to Ronald Quan and the continuation of U.S. Pat. No. 6,931,547 B2 being, U.S. Pat. No. 7,100,209 B2 entitled "METHOD TO PROVIDE THE GENERATION OF AN INCORRECT OR UNRELIABLE VERTICAL/FRAME SIGNAL" which issued on Aug. 29, 2006 to Ronald Quan each disclose techniques for modifying the characteristic signals of the Vertical Blanking Interval (VBI) for the generation of an incorrect or unreliable vertical or frame rate signal, via particular characteristics and/or peculiarities of the signals in the VBI.

The aforementioned copy protection (CP) methods and apparatus and the complementary defeat methods and apparatus (anti-CP) are associated with any type of disruption of the synchronizing format of a video signal which requires unique circuit arrangements of commonly available analog circuits and/or digital circuits. Many of these circuits and sub-circuits are comprised of fixed components and hardwiring defining narrow operating characteristics and parameters thus limiting flexibility. A complete unified system that effectively encompasses CP methods and apparatus and/or anti-CP methods and apparatus using the same circuitry and sub-circuitry would be cumbersome and limited in operational flexibility. The generation of corrective sync signals is a part of a unified system. Methods and apparatus for generating television sync signals have also been devised. U.S. Pat. No. 4,169,659 entitled "MULTIPLE STANDARD TELEVISION SYNC GENERATOR' which issued on Oct. 2, 1979 to Frank J. Marlowe discloses such an apparatus. This disclosure does not lend itself readily to the application of CP and/or anti-CP systems because it requires a particular synchronizing signal which limits its flexibility. The aforementioned apparatus cannot be programmed to respond to any selected event, such as sync pulses, other than synchronization during normal operation. The apparatus cannot be programmed to generate single pulse or partial pulse trains from selected outputs as required. The following brief summary of the present invention will clarify additional limitations and shortcomings of the entire aforementioned prior art.

BRIEF SUMMARY OF THE INVENTION

The primary object of the present invention is to defeat or reduce the effectiveness of copy protection signals, which have been added to inhibit recording of a video signal. The added pulses may be present in a given modified video signal of any format and/or standard. Another object of the present invention is to strengthen and reestablish video sync pulse and AGC level parameters of distorted and weakened video signals occurring resultant of external interference, inadequate transmission apparatus and techniques, and other forms and/or sources of video signal degradation. In accordance of the foregoing objects, the preferred embodiment of the present invention processes all horizontal sync pulses contained within a given video signal to maintain and/or reestablish the sync pulse parameters of any given format and/or standard. This is accomplished by inserting a plurality of synthesized partial and/or complete sync pulse related pulse trains in the composite sync signal. These pulse trains are generated by a microcontroller. The insertion of these sync pulse trains utilizes digital signal masking techniques. The regenerated composite sync pulse trains are inserted into the video signal as an overlay onto the existing composite sync signal. Any sync pulse abnormalities caused by the aforementioned process and/or external sources of signal degradation and pseudo sync pulses, if any, are detected during the horizontal sync processing. These detected pulses are used as a pseudo-sync stripping signal in a stripping process of the present invention. The later portion of the vertical blanking interval, or VBI, starting from the first post equalizing pulse, but excluding the post equalizing pulses and the horizontal sync pulses, are DC restored. All back porch portions of the horizontal blanking intervals, or HBI, for the remainder of the current field and/or frame are also DC restored. DC restoration pulse trains are generated by the microcontroller. The video signal is repetitively and systematically processed by means of the aforementioned operations for each field and/or frame, in accordance to the established parameters of any given standard and/or format. The embodiments disclosed herein are of the context of the NTSC television standard and of the SDTV or Standard Definition Television formats, with modification apparent to one of ordinary skill in the art they are applicable to SECAM or PAL television standards and of the SDTV formats. Another object of the present invention is the reduction of hybrid and specialized circuits that would be required to accommodate the neutralization of the numerous copy protection techniques and apparatus currently available. Any significant changes in the aforementioned techniques would require changes in circuit components and/or the addition of complete circuits. The modification of circuitry is reduced by the use of microcontrollers and appropriate user programs in the present invention. User programs can be changed with relative ease in order to adjust to any changes in the aforementioned techniques. The microcontrollers have a function of, but not limited to, generating all of the necessary corrective signals. Another object of the present invention is the ability to introduce copy protection signals into a video signal. The present invention encompasses both device and method for achieving any of the foregoing objects. These objects and other aspects, features and advantages will become apparent upon review of the following detailed description taken in conjunction with the accompanying drawings.

BRIEF DESCRIPTION OF THE DRAWINGS

FIG. 7A is an assemblage of pertinent signal waveform diagrams generated and/or processed, being that of a standard 4:3 aspect ratio, standard definition NTSC format video signal, during the operation of the present invention;

DETAILED DESCRIPTION OF THE PREFERRED EMBODIMENTS OF THE INVENTION

Figure 2:
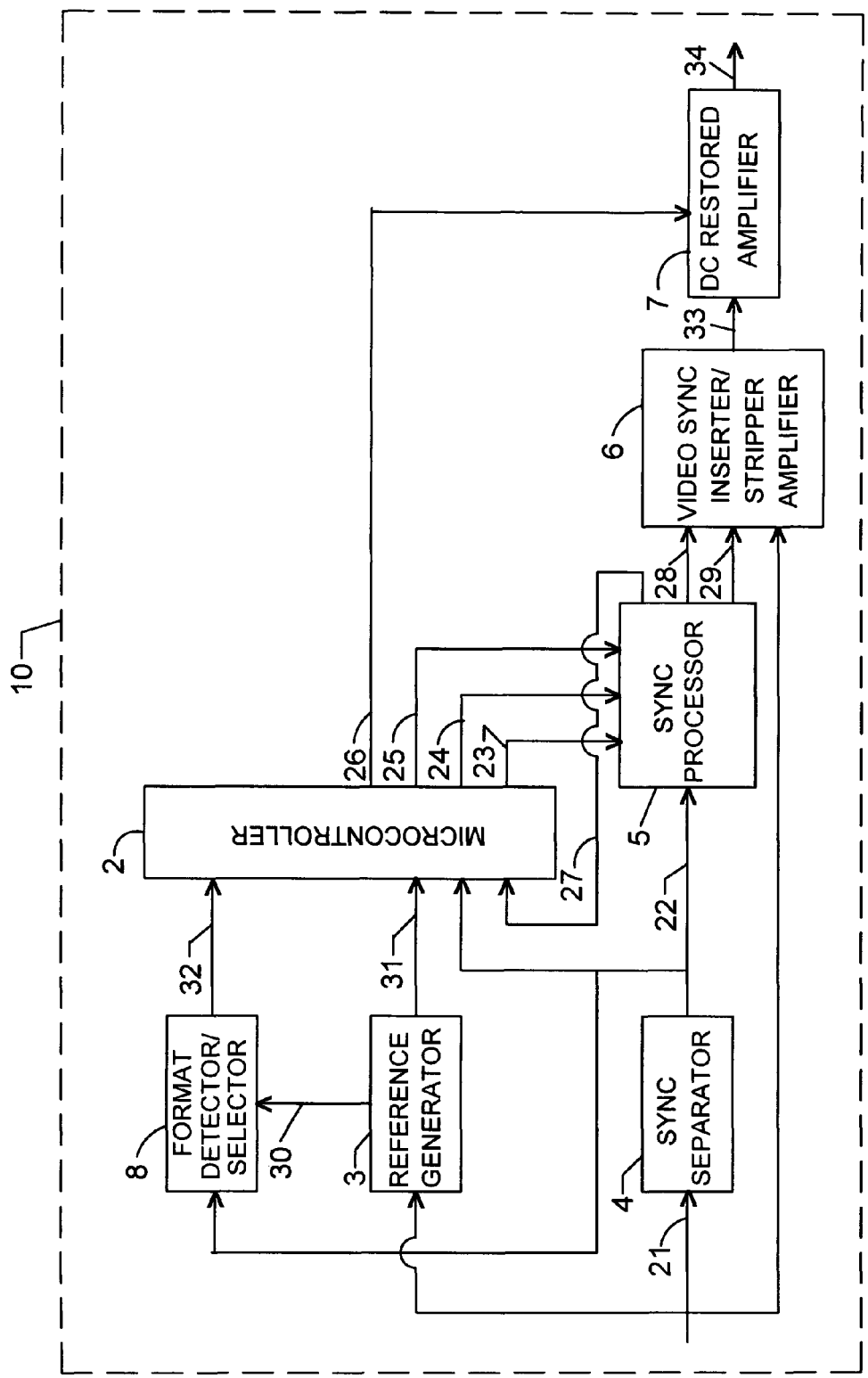
FIG. 2 is a block diagram of another illustrative embodiment of a device in accordance with the present invention.
Figure 3:
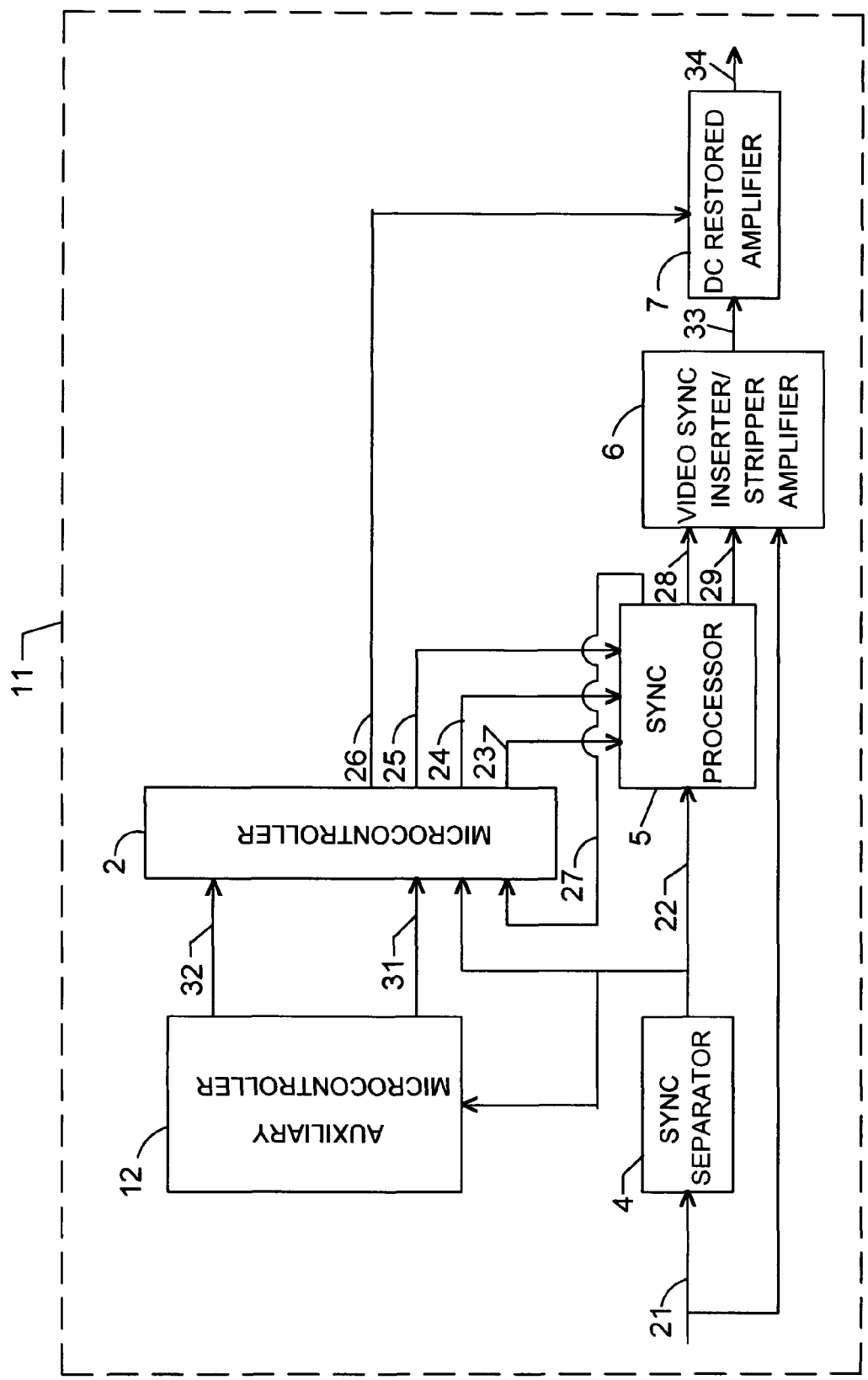
FIG. 3 is a block diagram of another illustrative embodiment of a device in accordance with the present invention.
Figure 4:
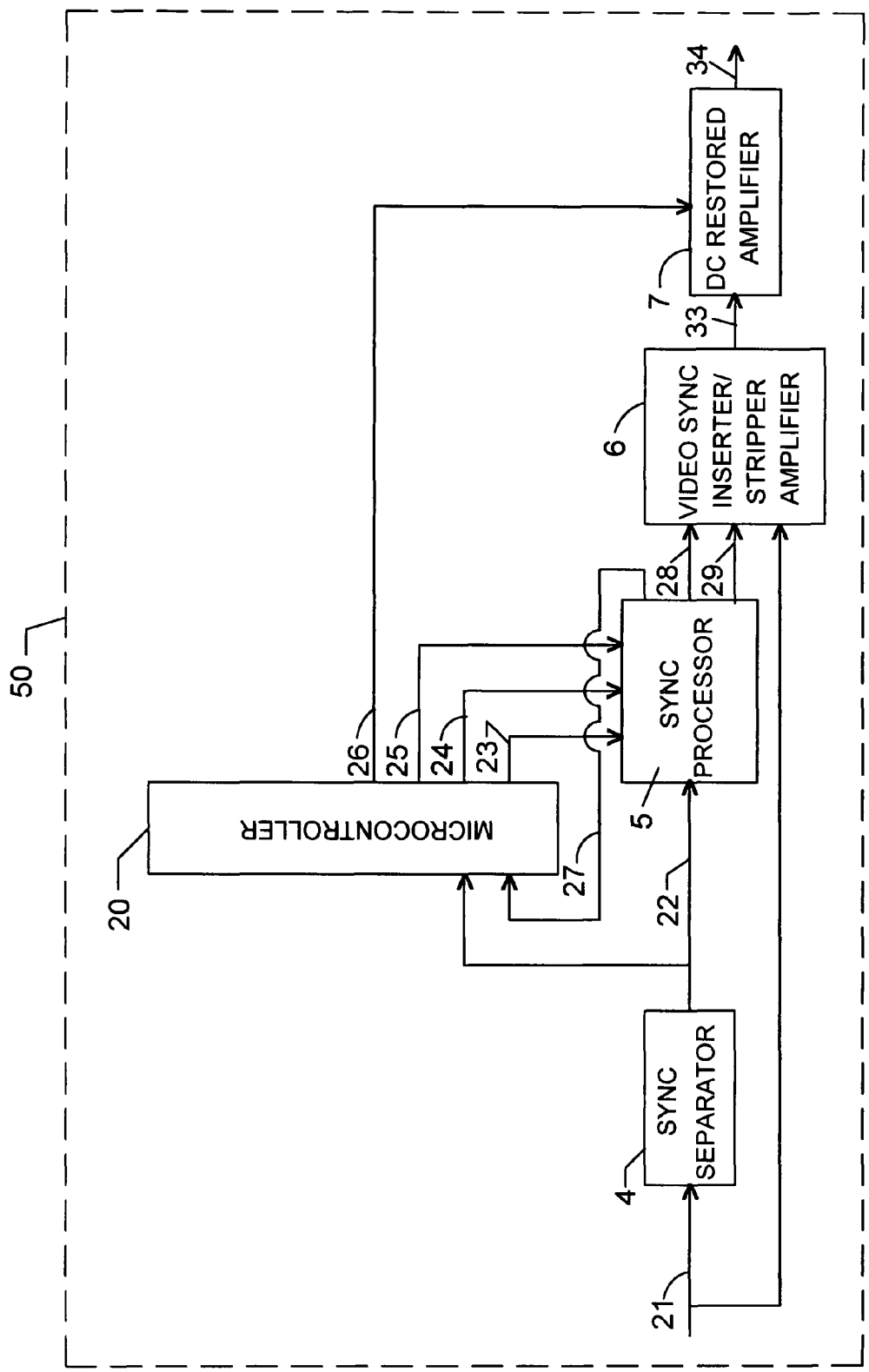
FIG. 4 is a block diagram of another illustrative embodiment of a device in accordance with the present invention.

The first function of the present invention is to maintain and/or restore proper horizontal sync pulse parameters of a video signal by means of full and/or partial reconstruction and insertion of a composite sync signal within said video signal. The second function is to strip any pseudo sync pulses from said video signal. The final function is to maintain and/or restore proper AGC levels throughout said video signal. Referring now to the invention in more detail, in FIG. 1, a device 1 performs the foregoing functions by incorporating the use of a microcontroller 2, a reference generator 3, a sync separator 4, a sync processor 5, a video sync inserter/stripper amplifier 6, a DC restored amplifier 7 and a format detector/selector 8. The device 1 has a video signal 21 applied to the input of the sync separator 4 and to an input of the video sync inserter/stripper amplifier 6. The sync separator 4, whose circuitry and operation are well known to those skilled in the art, extracts a pre-corrected composite sync signal 22 from the video signal 21. In the preferred embodiment of the present invention, the operating point of the sync separator 4 is set to detect signals from or above negative 40 IRE and to or below negative 10 IRE. This range assures the detection of any pseudo sync pulses which may be present in the video signal 21. The sync separator 4 will then detect the color burst signals that normally occur during the back porch portion of the video signal 21. It will be shown during the description of the sync processor 5, that appropriate compensation is made for the detection of the color burst signal by the sync separator 4. In the embodiment illustrated in FIG. 1, the output of the sync separator 4 is the pre-corrected composite sync signal 22, which consists of digital logic levels applied to appropriate inputs of the microcontroller 2, the reference generator 3, the sync processor 5 and the format detector/selector 8. A user program is contained within the program of flash memory of the microcontroller 2, which instructs the microcontroller 2 to generate various waveforms that enable device 1 to perform all operations necessary for the proper execution of the foregoing functions. In one embodiment of the present invention, once the microcontroller 2 is initialized, the microcontroller 2 awaits for an interrupt. Those skilled in the art know this as an interrupt-generated program. The interrupt provides a reference or starting point of the user program. The interrupt is generated by the application of a reference pulse, contained within a reference signal bus 31, to a designated input pin of the microcontroller 2 from the reference generator 3. The reference signal bus 31 consists of, but not limited to, one reference signal. In one embodiment of the present invention, the reference signal bus 31 contains a composite sync signal, a vertical sync pulse signal and an even/odd field signal. The composite sync signal provides horizontal sync pulses that would provide line start indication for the microcontroller 2. The vertical sync pulse signal would provide an interrupt that is applied to the microcontroller 2. The even/odd field signal would direct the microcontroller 2 to the part of the program for the field detected. In other embodiments of the present invention, various other circuits are available for the application as a means for determining or extracting sync signal portions that have different qualities from the rest of the composite sync signal. The color burst, pre-equalizing pulses, post equalizing pulses, pulse interval durations and pulse durations are among these sync signal portions. The processing of a single or a plurality of the selected composite sync signal portions provides a reference or starting point for the interrupt-generated program. Circuits that are commercially available as integrated circuits include the LM1881 sync separator. In one embodiment of the present invention, the LM1881 can be used as the reference generator 3 of a device 10 illustrated in FIG. 2. The video signal 21 is the input to the reference generator 3 in this embodiment which, in this example, is the LM1881. The LM1881 provides the reference signal bus 31 to be applied to the proper inputs of the microcontroller 2 and a reference data signal bus 30 to be applied to the appropriate inputs of the format detector/selector 8. The LM1881 provides a composite sync signal output, a vertical sync pulse signal output, an even/odd field signal output and a back porch output as component signals of the reference data bus 30 and the reference signal bus 31. The reference signal bus 31 is the primary source of data pulses required by the microcontroller 2. The more sensitive sync separator 4, as previously described, is the primary source of the pre-corrected composite sync signal 22 to be corrected and/or modified by the sync processor 5. The pre-corrected composite sync signal 22 is also applied to an input of the microcontroller 2 as supplemental data for any optional operations desired. Many integrated circuits provide outputs that are void of pseudo sync pulses, such as the EL1883 and the ISL59885. Both of these circuits have replaced the even/odd field output with a horizontal sync output, which requires that a means of field detection would be that of a function of the format detector/selector 8 or a sub-routine of the user program of the microcontroller 2. The ISL59885 replaces the back porch output with a HD output which provides SD or standard definition or HD or high definition detection. Other integrated circuits, such as the EL4511 and the EL4583, provide additional signals that may be used for further processing, thus increasing the amount of data available to be considered in the user program and acted on by the microcontroller 2. The major advantages of the use of these integrated circuits are obviously the available diverse signals and versatility, as well as the reduced number of circuit elements and reduced cost. Still in another embodiment of the present invention, as illustrated in FIG. 3, an auxiliary microcontroller 12 is incorporated in a master-slave or co-processor circuit in a device 11, replacing the reference generator 3 and the format detector/selector 8 of the device 1 in FIG. 1 and device 10 in FIG. 2. FIG. 4 illustrates another embodiment of the present invention, in which a microcontroller 20 in a device 50 replaces the microcontroller 2 and the auxiliary microcontroller 12 of device 11 in FIG. 3, and replaces the microcontroller 2, reference generator 3, and format detector/selector 8 of device 1 in FIG. 1 and device 10 in FIG. 2. The microcontroller 2, the microcontroller 12 and the microcontroller 20 of the embodiments of the present invention will each have an operating or system clock of at least ten megahertz and be able to complete one instruction per cycle through a majority of the instruction set. These minimum requirements are set forth to ensure adequate processing. A major advantage of the use of the microcontroller is its ability to emulate a majority of hybrid and specialized sync processing circuit. This is dependent upon the available auxiliary functions, system clock speed, program memory capacity and the user program and/or a sub-routine within a program which directs microcontroller 2, microcontroller 12 and microcontroller 20 to perform the operations of the said sync circuits. For those skilled in the art, the incorporation of said integrated circuits would require adherence to proper design criteria to ensure overall circuit compatibility.

Figure 1:
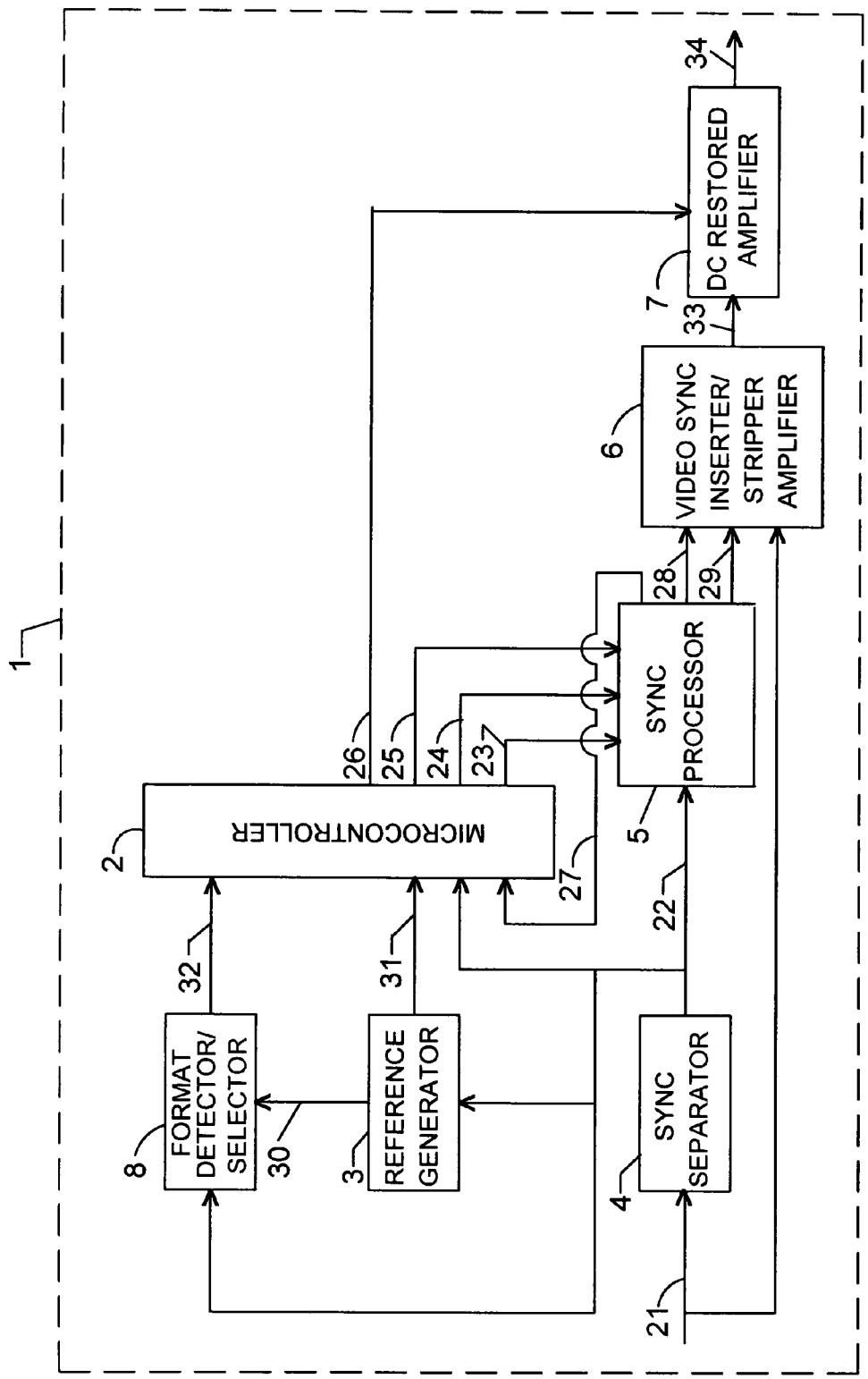
FIG. 1 is a block diagram of an illustrative embodiment of a device in accordance with the present invention.
Figure 5:
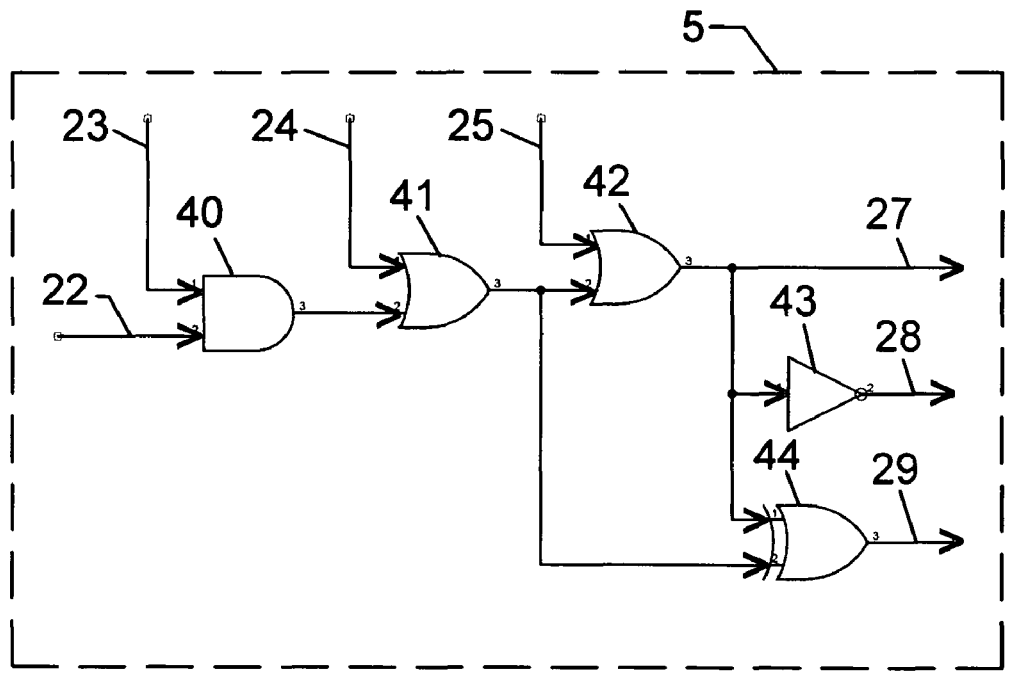
FIG. 5 is a detailed diagram of an example circuit which processes the composite sync signal during the operation of all embodiments of the present invention.

In more detail, still referring to the embodiment of the present invention of FIG. 1, the output signals from the microcontroller 2 are, but not limited to, a sync pulse signal 23, a back porch signal 24, and a pulse-to-pulse interval signal 25 and are applied to the appropriate inputs of the sync processor 5. The microcontroller 2 does not generate these signals until the examplatory interrupt-generated program is running. The microcontroller 2 and the sync processor 5 regulate pulse duration, masking and timing, insertion of missing pulses, detection and/or insertion of pseudo sync pulses and the synthesis of sync pulse phase-shift of the pre-corrected composite sync signal 22. FIG. 5 illustrates details of an example sync processor 5 consisting of, but not limited to, five digital logic gates. The pre-corrected composite sync signal 22 is applied to one input of a logical AND gate 40. The sync pulse signal 23, from the microcontroller 2, is applied to the other input of the logical AND gate 40 which has a function to ensure that any sync pulse being processed is of the minimum duration required for the video format detected and/or selected. This includes not only the horizontal sync pulses, but also the pre-equalizing pulses, post-equalizing pulses, and the vertical sync pulses as well, if within the user program content. Another function of the logical AND gate 40 is to assist in the synthesis of sync pulse phase-shift by increasing the duration of the leading or lagging edge of the sync pulse being processed. Increasing the duration of the said sync pulse from its leading edge has the effect of advancing the said pulse once the pulse duration is equally decreased from its lagging edge. Conversely, increasing the duration of the said sync pulse from its lagging edge has the effect of retarding the said pulse once the pulse duration is equally decreased from its leading edge. Still, another function of the logical AND gate 40 is to insert missing pulses. Missing pulses are detected by the microcontroller 2 with a appropriate program and are generated as a pulse in the sync pulse signal 23. Another function of the logical AND gate 40 is the insertion of pseudo sync pulse. This enables all devices of all the embodiments of the present invention to have the potential of being an encoder/decoder. The output of the logical AND gate 40 is connected to one input of a logical OR gate 41. The back porch signal 24 from the microcontroller 2 is applied to the other input of the logical OR gate 41 which functions to compensate for the normal color burst signal detected by the sync separator 3. This is accomplished by the introduction of a corresponding positive pulse in the back porch signal 24. The output of the logical OR gate 41, which may contain pseudo sync pulse elements, is applied to one input of a logical OR gate 42 and to one input of a logical X-OR gate 44. The pulse-to-pulse interval signal 25 from the microcontroller 2 is applied to the other input of the logical OR gate 42 which has a function to provide additional compensation for the said color burst signal and to eliminate or mask the pseudo sync pulses, if any, contained in the pre-corrected composite sync signal 22. This is accomplished by the introduction of a positive pulse in the pulse-to-pulse interval signal 25 generated by the microcontroller 2 corresponding to the interval between pulses. The pulse length is dependent upon which portion of the pre-corrected composite sync signal 22 is being processed at that time. Another function of logical OR gate 42 is to assist in the synthesis of sync pulse phase-shift in advancing the leading edge or retarding the lagging edge of a sync pulse by decreasing the duration of the said sync pulse lengthened by logical AND gate 40 as previously described. The output of the logical OR gate 42 is a corrected composite sync signal 27 which is applied to the input of a logical inverter 43 and to the other input of the logical X-OR gate 44. The output of the logical inverter 43 is a corrected inverted composite sync signal 28. The output of the logical X-or gate is an error signal which is a pseudo sync signal 29. The pseudo sync signal 29 contains pseudo sync pulses to be stripped and/or portions of pulses to be stripped as part of the synthesis of sync pulse phase-shift process. Referring to FIG. 1 and considering the foregoing partial description of the device 1, it may be seen that the microcontroller 2, the reference generator 3 and the sync processor 5 form a loop that has some of the operational characteristics analogous to that of a phase locked loop or PLL, whose operation is known to those skilled in the art.

When the microcontroller 2 is initialized and awaiting the first interrupt or has just finished executing an interrupt service routine and is awaiting the next interrupt, the outputs of the microcontroller 2 which generates each of the aforementioned signals are each placed at a specific logic level. In this embodiment of the present invention, the sync pulse signal 23 is placed at a digital logic level of one, the back porch signal 24 is placed at a digital logic level of zero, and the pulse-topulse interval signal 25 is placed at a digital logic level of zero. These specified digital logic levels enable the sync processor 5 to pass the pre-corrected composite sync signal 22 unaltered until the program is running. The pseudo sync signal 29 is void of any pseudo sync pulses and remains at a digital logic level zero during this time. Once the reference generator 3 produces a vertical sync pulse, the interrupt-generated program instructs the microcontroller 2 to identify the format detected and/or selected by means of the format detector/selector 8 and to spontaneously generate the aforementioned signals which are applied to the sync processor 5 to produce the remainder of the vertical sync pulses and produce the post-equalizing pulse portion of the format detected and/or selected. The commonly used formats are the NTSC, PAL and SECAM television standards, which are further, divided into SDTV formats with several different aspect ratios available. These format parameters are programmed, as required, into the program memory of the microcontroller 2. The format detector/selector 8 has, but not limited to, one digital logic output contained within a format data bus 32 that is used to determine what part of the program the microcontroller 2 is directed to. The format detector/selector 8 operates by means of an automatic detection or determining device or by means of a manual selection device. In addition to the pre-corrected composite sync signal 22 from the sync separator 4, a reference data bus 30 consisting of, but not limited to, one data signal produced by the reference generator 3, is applied to an input of the format detector/selector 8 for any required processing. The microcontroller 2 is then directed by the program to start the required counting, I/O, logic and timing operations in order to generate the necessary signals and execute the interrupt service routine. FIG. 7A illustrates two sets of five waveform diagrams. Each set contains waveform diagrams of the pre-corrected composite sync signal 22, the sync pulse signal 23, the back porch signal 24, the pulse-to-pulse interval signal 25 and a gate signal 26 produced by the microcontroller 2, when processing a normal, standard 4:3 aspect ratio, standard definition NTSC video signal. One set relates to the odd field of a complete frame while the other set relates to the even field of said frame. The waveforms depicted are those of a particular user program with ideal conditions. A plurality of user programs is applicable to any one of the embodiments of the present invention and results in a plurality of available waveforms which may differ slightly in appearance than those of FIG. 7A.

Figure 7B:
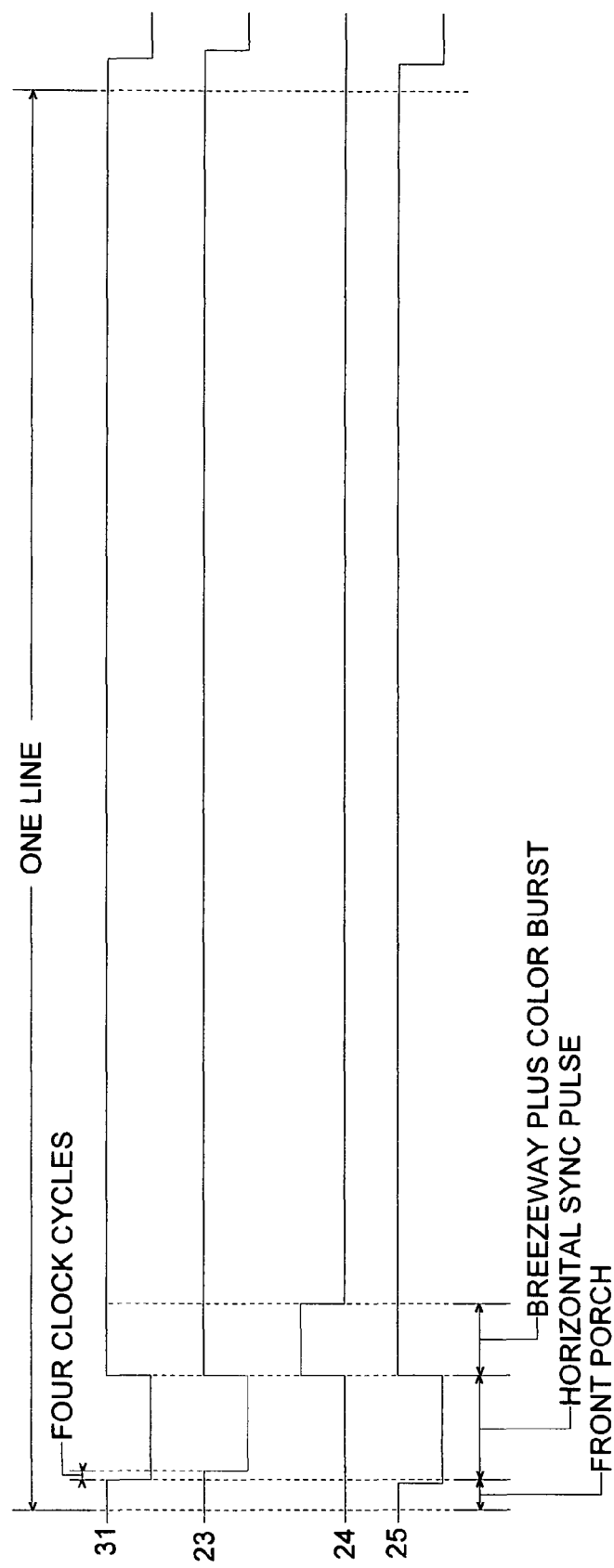
FIG. 7B is an assemblage of pertinent signal waveform diagrams representative of a single video line illustrative of microcontroller instruction execution delay time.

In the preferred embodiment of the present invention, the user program directs the microcontroller 2 to generate a sync pulse of the sync pulse signal 23, which is a negative going pulse, on the leading edge or falling edge of a horizontal sync pulse of a composite sync signal contained within the reference signal bus 31 generated by the reference signal generator 3. Once the microcontroller 2 detects the leading or falling edge of the said horizontal sync pulse, there are a minimum of instructions which must be performed by the microcontroller 2 to produce the required outputs. Three instructions are typical of most microcontrollers and are as follows as an example. The first of these typical instructions is a test bit instruction which would generally take two clock cycles. The next typical instruction would be a load data into the accumulator or register instruction using one clock cycle. The final typical instruction is a port output instruction to initiate the sync pulse signal 23. The generation of the sync pulse signal 23 is delayed by four clock cycles and is taken into account in the user program by defining the duration of the horizontal sync pulse as 4.7 microseconds minus four clock cycles. Instruction execution times and delays are similarly taken into account in this manner in all programs of all microcontrollers of all the embodiments of the present invention. FIG. 7B illustrates, in detail, one examplatory line of the aforementioned signals generated by the microcontroller 2. The system clock is twenty megahertz in this particular illustration. It follows that each sync pulse of the sync pulse signal 23 is lagging the said horizontal sync pulse of the reference signal bus 31 by four tenths of a microsecond or four hundred nanoseconds. The output of the logical AND gate 40 is of a duration of 4.7 microseconds for blanked video lines of the Vertical Blanking Interval or VBI and for the active video lines of the remainder of the current field. The microcontroller ignores any other pulses until the back porch signal 24 output and the pulse-to-pulse interval signal 25 output have completed their respective single pulse generation that compliments the said sync pulse. In the preferred embodiment of the present invention, the microcontroller 2 generates the back porch signal 24, which is a positive going pulse of a 3.2 microsecond duration, when the microcontroller 2 ends the sync pulse generation of the sync pulse signal 23. This occurs on the same output instruction of the user program that terminates the generation of the sync pulse of the sync pulse signal 23. The normal back porch duration is 4.7 microseconds. The back porch signal 24 duration is the sum of the breezeway duration and the color burst signal duration. The breezeway is of a duration of 0.38 microseconds and the color burst signal is ten cycles of a 3,579,545 Hz waveform or 2.79 microsecond duration. This shorter pulse will enable the detection of pseudo sync pulse immediately following the color burst signal. The pulse-to-pulse interval signal 25 is comprised of a series of interval pulses with the first interval pulse being the remainder of the interval between the first two vertical pulses that is spontaneously generated at the start of the said interrupt service routine. The pulse-to-pulse interval signal 25 then follows the remainder of the vertical pulse sequence through the post-equalizing pulse sequence. The countdown to the last post-equalizing pulse by the microcontroller 2 triggers a positive going pulse whose duration is dependent upon the field being processed, which is contained in the user program. The microcontroller 2 times out the appropriate interval value for the length of the pulse to end just before the leading edge of the first horizontal sync pulse. The final sequence of positive going interval pulses commences when the microcontroller 2 ends the generation of the sync pulse signal 23 and the start of the back porch signal 24. Again, this occurs on the same output instruction of the user program that terminates the generation of the sync pulse of the sync pulse signal 23. The microcontroller 2 times out each interval pulse, according to the user program, which in the case of the NTSC SDTV format, which is duration of 57.4 microseconds. The duration the interval pulses may be extended to include the front porch portion of the next line, just ahead of the next horizontal pulse of the pre-corrected composite sync signal 22. The front porch portion of a video line has a duration of 1.4 microseconds, thus the duration of the interval pulses would be 58.8 microseconds. These pulses are generated until the end of the field as determined by the said user program. These interval pulses are the pulse-to-pulse interval signal 25, which may vary in duration and sequence of operation from format to format and in the foregoing example of operation is typical of the NTSC SDTV format.

Figure 6:
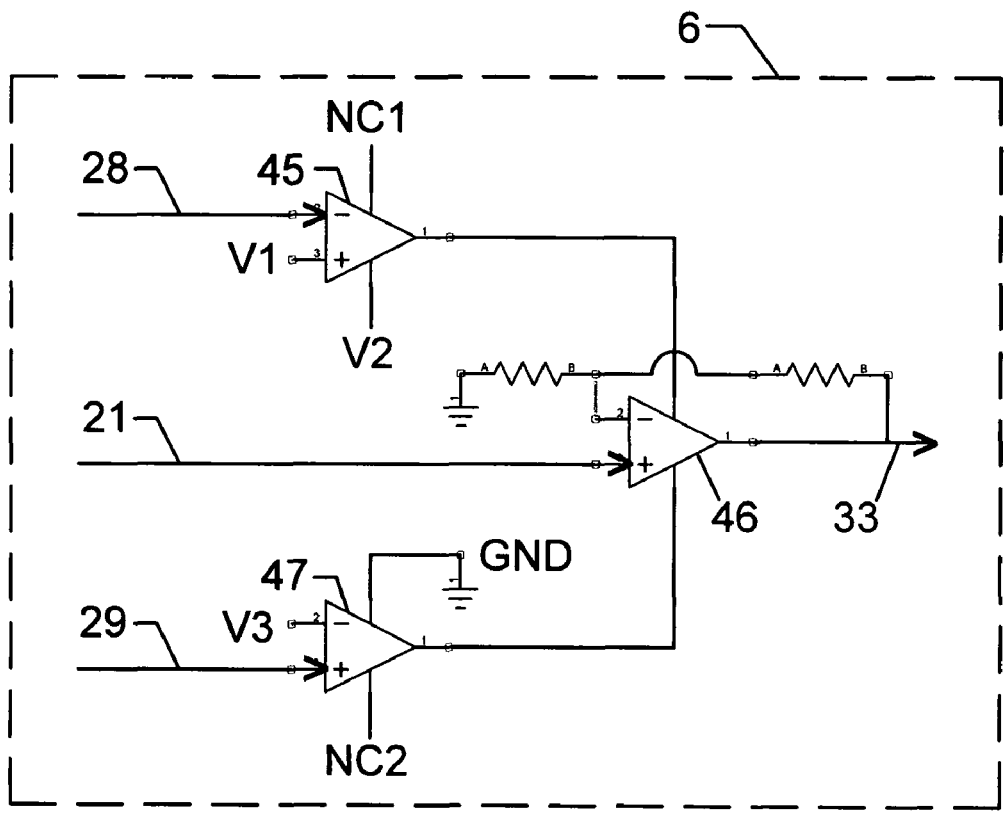
FIG. 6 is a detailed diagram of an example circuit which inserts a corrective sync signal and strips pseudo sync signals from a video signal during the operation of all embodiments of the present invention.

Referring again to FIG. 1, the sync inserter/stripper amplifier 7 has, but not limited to, three input signals, which are the video signal 21, the corrected inverted composite sync signal 28 and the pseudo sync signal 29. FIG. 6 illustrates details of an example sync inserter/stripper amplifier 6, consisting of, but not limited to, three voltage limiting operational amplifiers, which are configured as a composite sync comparator 45, a pseudo sync comparator 47 and a video buffer 46. Sync inserters and sync strippers are well known to those skilled in the art and the video electronics industry, especially cable antenna television or CATV. The composite sync comparator 45 is operated as an open loop comparator with the high output voltage limiting pin NC1 open, the low output voltage-limiting pin at a negative voltage V2, and a positive threshold voltage V1 applied to the non-inverting input. The positive threshold voltage V1 is one-half a logic level of one and the corrected inverted composite sync signal 28 is applied to the inverting input of the composite sync comparator 45. The output of the composite sync comparator 45 is applied to the high output voltage-limiting pin of the video buffer 46. When the corrected inverted composite sync signal 28 is below the positive threshold voltage V1 indicating the absence of a sync pulse, the composite sync comparator 45 is off and has no effect on the operation of the video buffer 46. Once the corrected inverted composite sync signal 28 is above the positive threshold voltage V1, indicating the presence of a sync pulse, and the sync comparator 45 turns on and produces an output pulse limited to the negative voltage V2, which is applied to the high output voltage-limiting pin of the video buffer 46. This condition inserts the corrected inverted composite sync signal 28 onto the video signal 21, generating a signal that is sync corrected and/or maintained depending upon the degree of sync degradation. Referring again to FIG. 6, the pseudo sync comparator 47 is operated as an open loop comparator with the low output voltage limiting pin NC2 open, the high output voltage-limiting pin GND applied to ground and a positive threshold voltage V3 applied to the inverting input. The positive threshold voltage V3 is one-half a logic level of one and the pseudo sync signal 29 is applied to the non-inverting input of the pseudo sync comparator 47. The output of the pseudo sync comparator 47 is applied to the low output voltage-limiting pin of the video buffer 46. When the pseudo sync signal is below the positive threshold voltage V3, indicating the absence of any pseudo sync pulses, the pseudo sync comparator 47 is off and has no effect on the operation of video buffer 46. Once the pseudo sync signal 29 is above the positive threshold voltage V3, indicating the presence of a pseudo sync pulse, the pseudo sync comparator 47 turns on and produces an output to ground, which is applied to the low output voltage-limiting pin of video buffer 46. This condition grounds or strips the pseudo sync pulse from the video signal 21. The resultant output from the video sync inserter/stripper amplifier 6 is a sync corrected video signal 33.

Figure 9:
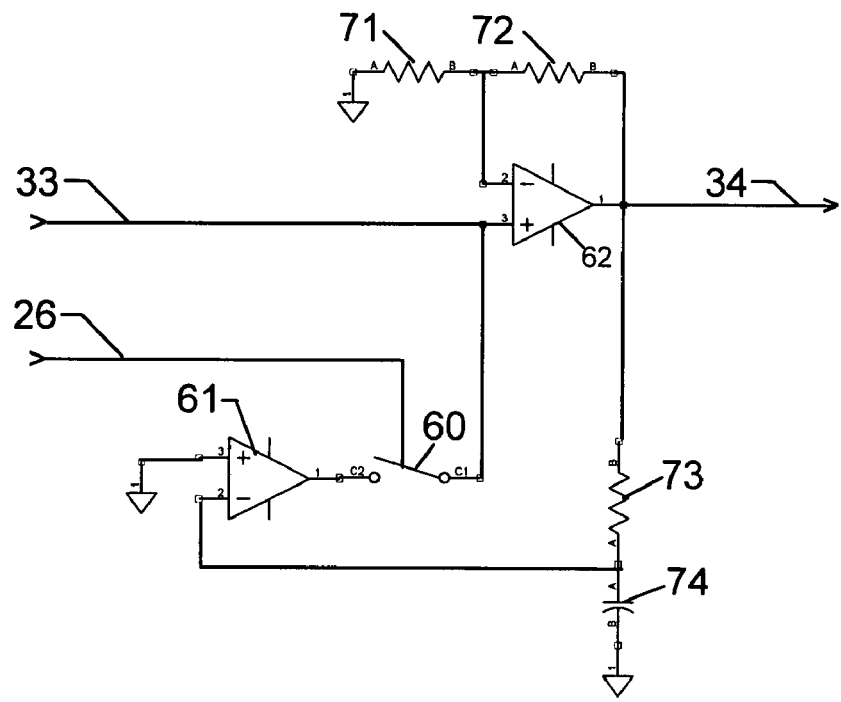
FIG. 9 is a detailed diagram of an example circuit which corrects the AGC level during the operation of the present invention.

Referring to FIG. 1, the sync corrected video signal 33 is applied to the video input of the DC restored amplifier 7. There are many DC restored amplifiers commercially available as complete units in the form of an integrated circuits, such as the EL4089 and the EL4390. The EL4089 is a complete single video amplifier subsystem. The EL4390 provides three channel operation for RGB and YUV applications. FIG. 9 depicts an illustrative example of the DC restored amplifier 7 that is typical of operation pursuant to that of the present invention. The microcontroller 2 generates a gate signal 26, which controls a gate 60 during the portions of the video signal that are to be DC restored via a DC loop amplifier 61. A resistor 73 and a capacitor 74 form a low pass filter as part of the DC loop. When the gate 60 of the DC restored amplifier 7 is active, the incoming signal, which is the sync corrected video signal 33, is DC restored to ground. When the gate is not active, the sync corrected video signal 33 passes through a video amplifier 62 unaltered except for amplification determined by a feedback loop of a resistor 71 and a resistor 72. In one embodiment of the present invention, the gate signal 26 produced by the microcontroller 2 is a combination of the first portion of the pulse-to-pulse interval signal 25, the latter portion of the back porch signal 24 and the addition of positive front porch pulses 36 in complementary fashion with the back porch signal 24. The duration of the positive front porch pulses 36 are of 1.4 microseconds each. The example gate signal 26 is further illustrated in FIG. 7C. The first part of the gate signal 26 is the beginning of pulse-to-pulse interval signal 25 to the end of the vertical blanking interval or VBI. From the end of the VBI to the end of the interrupt service routine, the front porch pulses 36 and the back porch signal 24 comprise the gate signal 26. The output of the DC restored amplifier is the AGC/sync corrected video signal 34.

Figure 8:
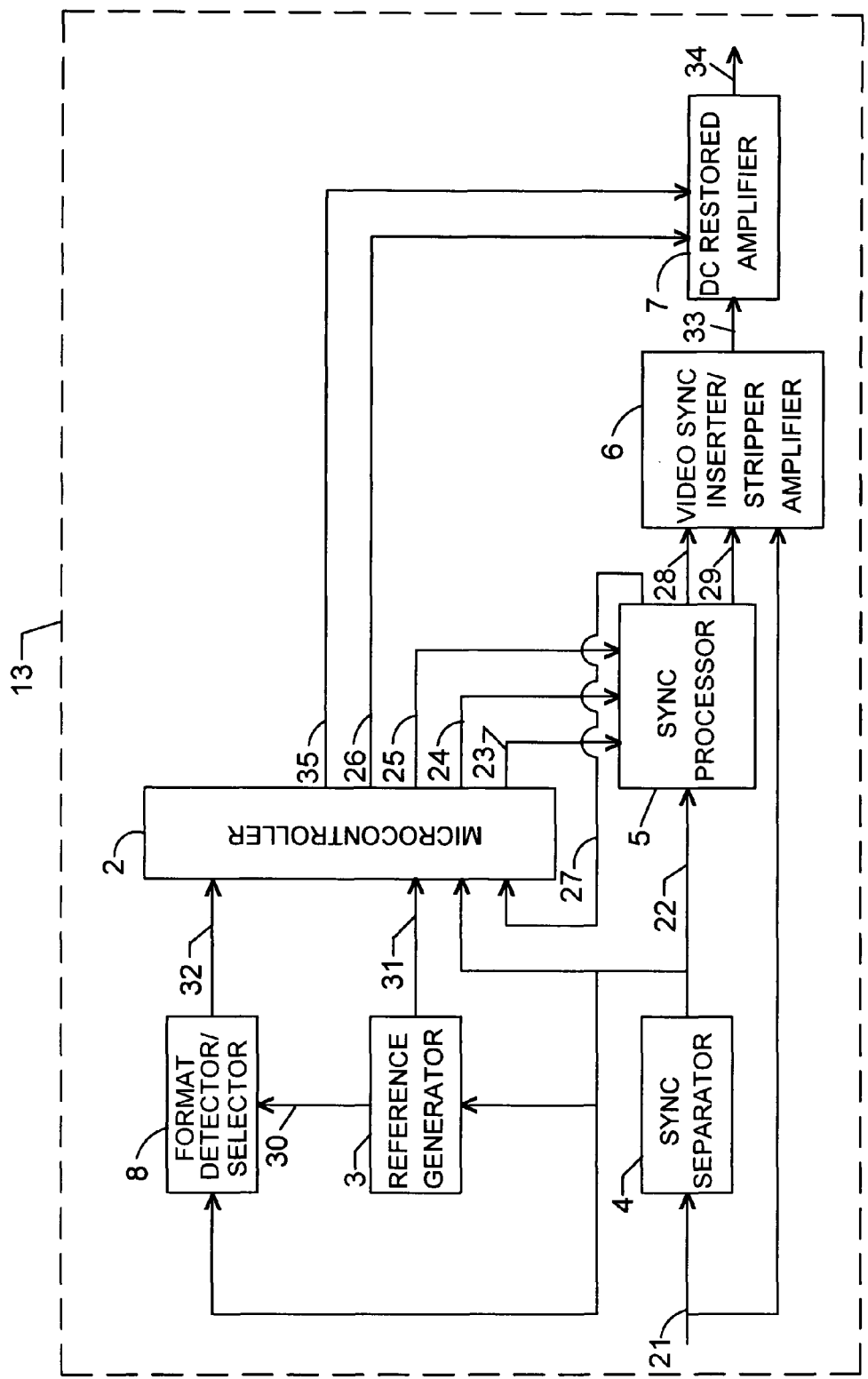
FIG. 8 is a block diagram of another illustrative embodiment of a device in accordance with the present invention, being a variation of FIG. 1.
Figure 10A:
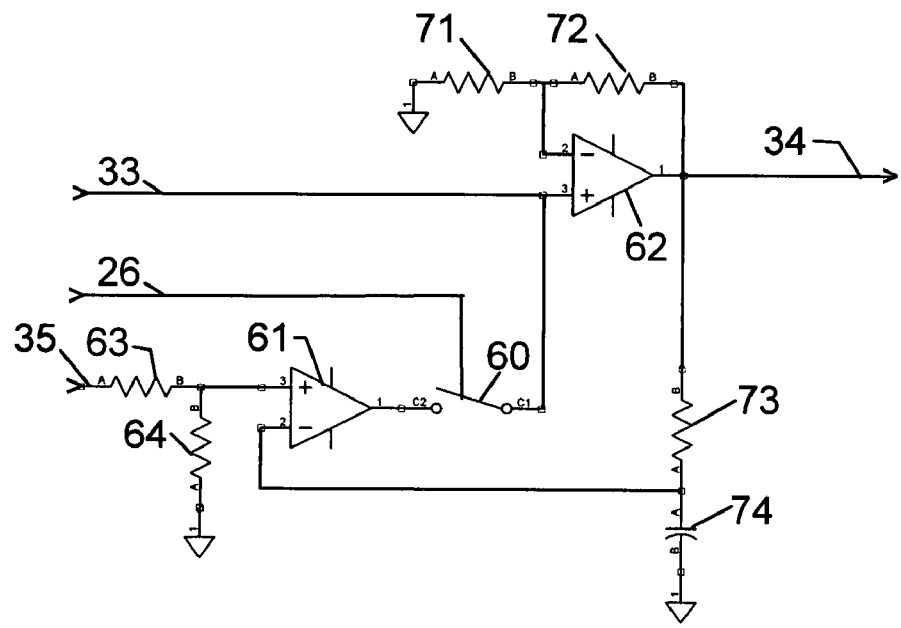
FIG. 10A, FIG. 10B and FIG. 10C are detailed diagrams of example circuits, which alternate the AGC level during the operation of the present invention as an encoder/decoder.
Figure 10B:
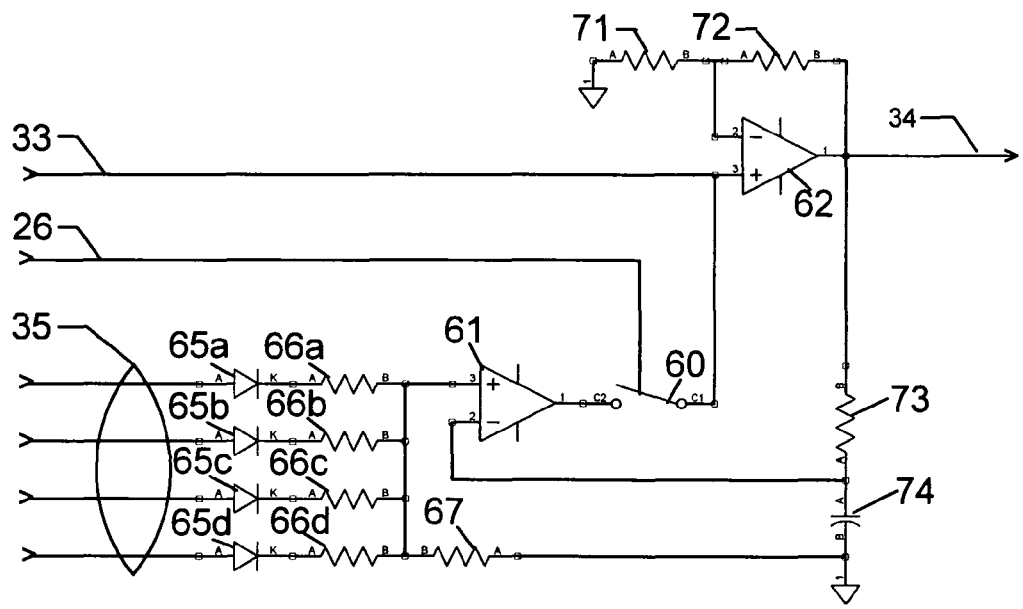
Figure 10C:
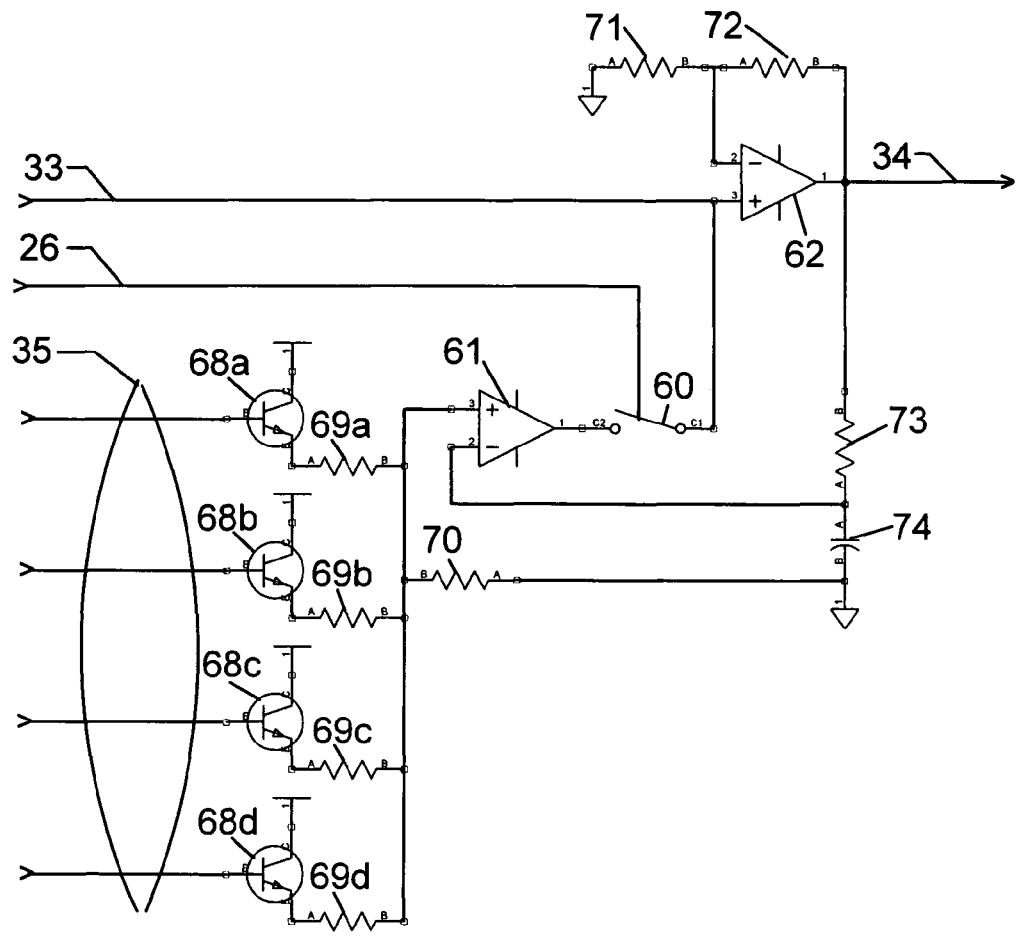
Figure 11:
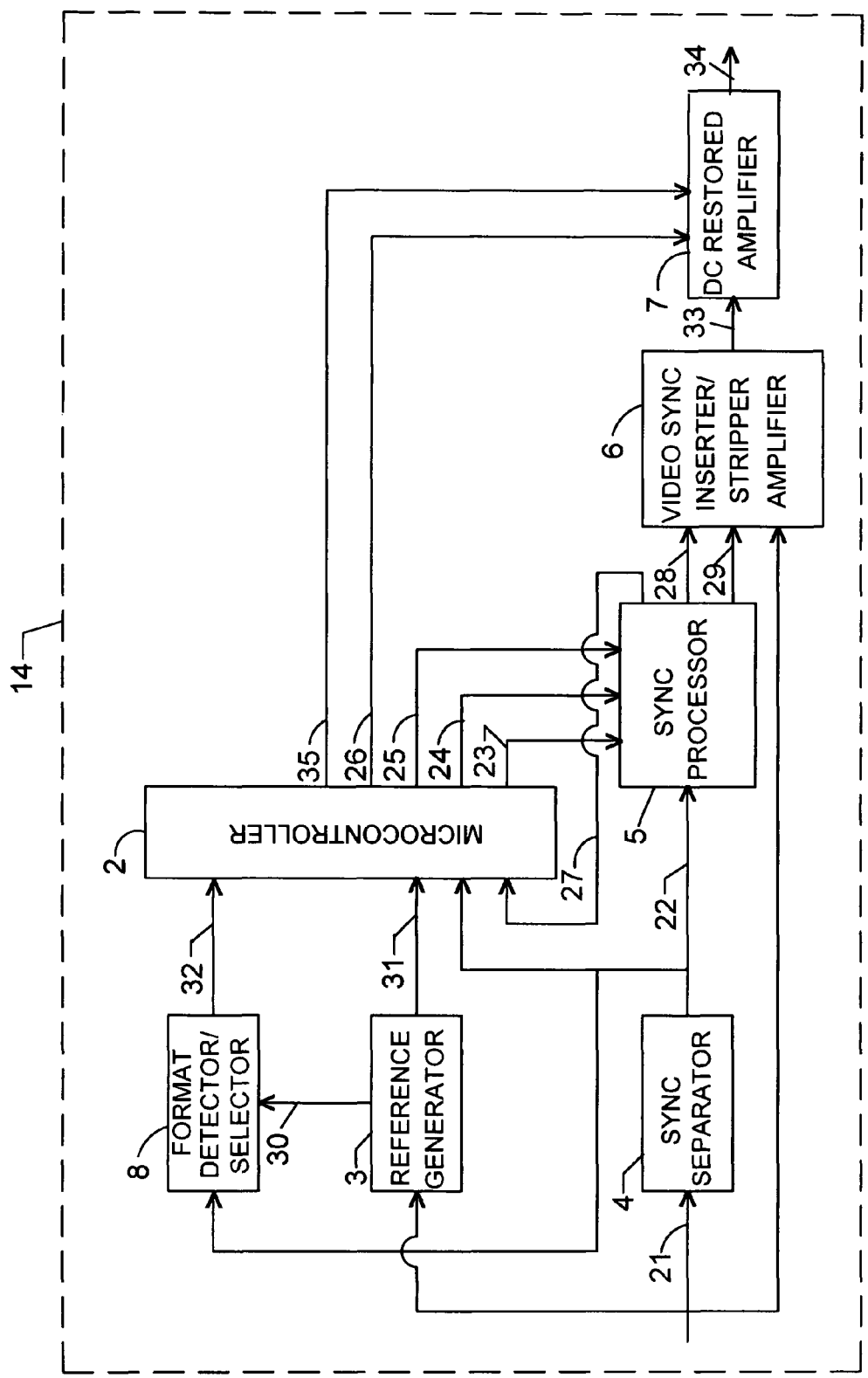
FIG. 11 is a block diagram of another illustrative embodiment of a device in accordance with the present invention, being a variation of FIG. 2.
Figure 12:
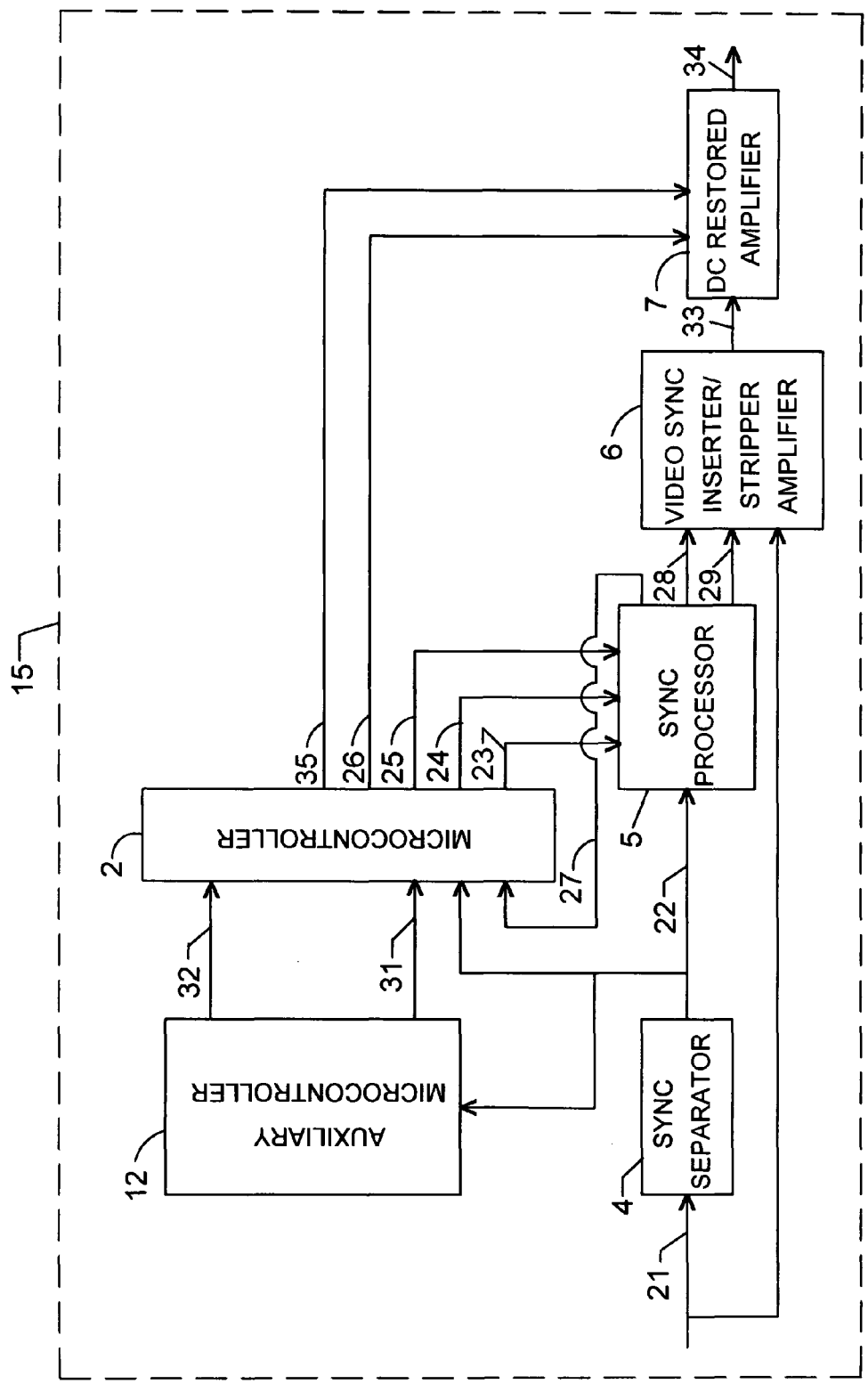
FIG. 12 is a block diagram of another illustrative embodiment of a device in accordance with the present invention, being a variation of FIG. 3.
Figure 13:
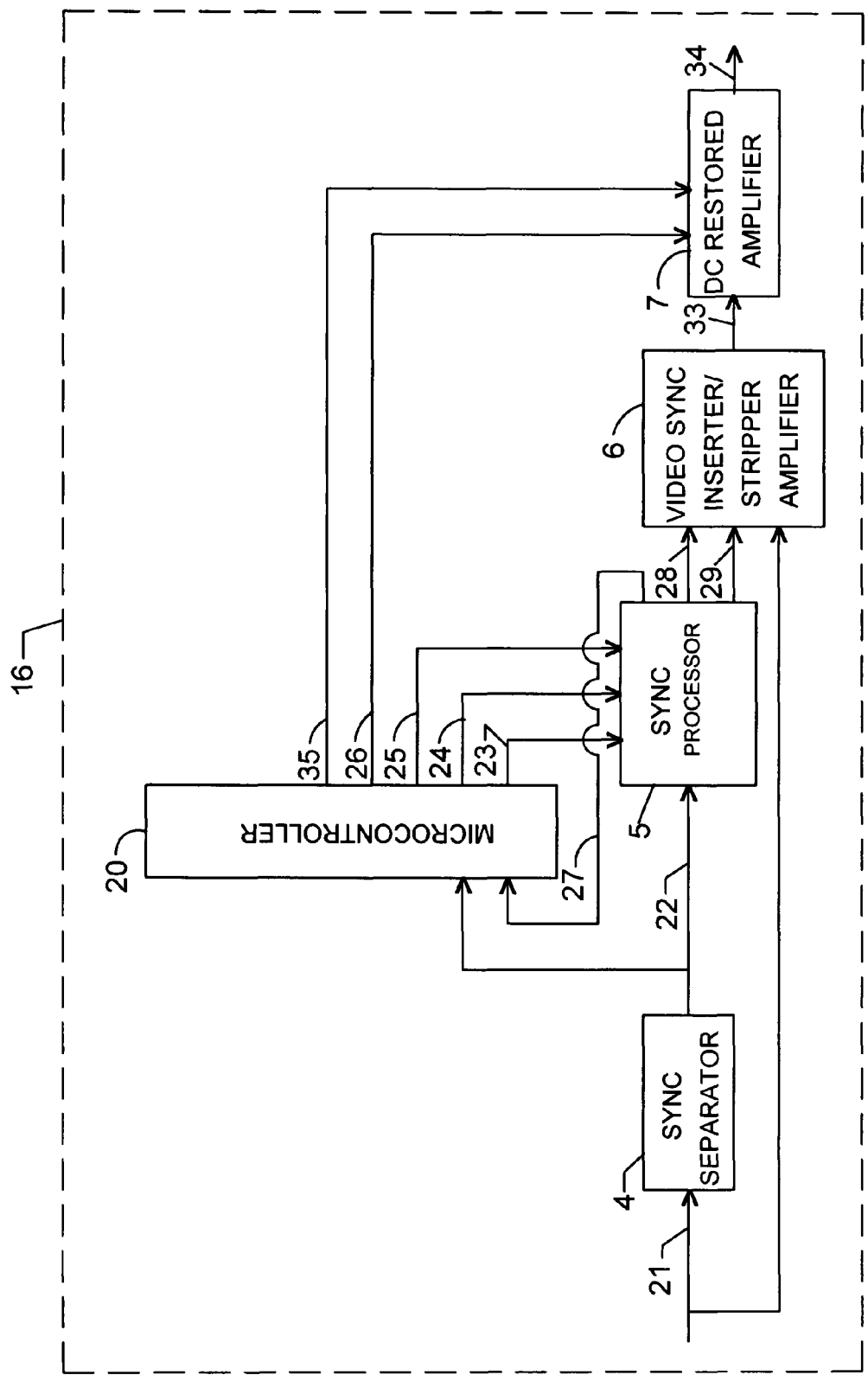
FIG. 13 is a block diagram of another illustrative embodiment of a device in accordance with the present invention, being a variation of FIG. 4.

FIG. 8 illustrates another embodiment of the present invention, where a device 13 is configured as a copy protection signal decoder/encoder. An AGC level signal bus 35 consisting of, but not limited to, one digital control signal which controls the selection of the level of the AGC pulse generation. The device 13 differs from device 1 of FIG. 1 only in the addition of an AGC level signal bus 35 from the microcontroller 2 to the DC restored amplifier 7. FIG. 11 illustrates another embodiment of the present invention, where device 14 is configured as a copy protection signal decoder/encoder. The device 14 of FIG. 11 differs from the device 10 of FIG. 2 only in the addition of an AGC level signal bus 35 from the microcontroller 2 to the DC restored amplifier 7. FIG. 12 illustrates another embodiment of the present invention, where device 15 is configured as a copy protection signal decoder/encoder. The device 15 of FIG. 12 differs from device 11 of FIG. 3 only in the addition of an AGC level signal bus 35 from the microcontroller 2 to the DC restored amplifier 7. FIG. 13 illustrates another embodiment of the present invention, where a device 16 is configured as a copy protection signal decoder/encoder. The device 16 of FIG. 13 differs from the device 50 of FIG. 4 only in the addition of an AGC level signal bus 35 from the microcontroller 2 to the DC restored amplifier 7. FIG. 10A is an example of an application of the AGC level signal bus 35 in which the AGC level of the DC restored amplifier 7 is switched alternatively to 0 IRE or 100 IRE by the microcontroller 2. This is accomplished by the use of a voltage divider consisting of a resistor 63 and a resistor 64. FIG. 10B and FIG. 10C each illustrate an example of an application of the AGC level signal bus 35 in which the AGC level of the DC restored amplifier 7 is switched alternatively to one of multiple values. FIG. 10B depicts the AGC level signal bus 35, for example, consisting of four signals from the microcontroller 2. Only one signal is activated at any one time and each signal is the voltage supply for each bias network. Each bias network consists of a blocking diode 65a, 65b, 65c or 65d, a bias resistor 66a, 66b, 66c or 66d and a common bias resistor 67. Each bias resistor 65a, 65b, 65c and 65d are of different values chosen to bias the DC loop amplifier 61 at different reference voltages between corresponding values of 0 IRE to 100 IRE. FIG. 10C depicts the AGC level signal bus 35, for example, consisting of four signals from the microcontroller 2. Only one signal is activated at any one time and each signal drives a transistor 68a, 68b, 68c or 68d. Each transistor controls the voltage supply for each bias network. Each bias network consists of a bias resistor 69a, 69b, 69c or 69d and a common bias resistor 70. Each bias resistor 69a, 69b, 69c or 69d are of different values chosen to bias the DC loop amplifier 61 at different reference voltages between corresponding values of 0 IRE to 100 IRE. The generation of positive AGC pulses as described is also applied in conjunction with the previously described synthesis of sync pulse phase-shift process. Device 1, device 10, device 11, device 13, device 14, device 15, device 16 and device 50 each inherently have the capability to insert pseudo sync pulses as directed by the user program of the microcontroller 2.

The advantages of the present invention include, without limitation, the inherent flexible features of microcontrollers. Microcontrollers are relatively inexpensive, compact, have in excess of one thousand erase/program cycles and easy to program. Most microcontrollers also have user defined dual function pins and a powerful instruction set. With the current evolution in video technology progressing at such a rapid rate, the microcontroller is the most essential part of the present invention because of the foregoing features and the currently progressive evolution of the microcontroller. These features allow the microcontroller to produce a plurality of corrective synchronized signals required for proper operation of the present invention. Those skilled in the art know these and other features of the microcontroller. Another advantageous feature is the ability of the present invention to introduce copy protection signals into a video signal, with little or no circuit modification and the appropriate program.

Most discussion in this specification has referenced the NTSC format of standard definition and standard, or 4:3 aspect ratio. However, the concepts are equally applicable to the PAL and SECAM standards and the variations of SDTV aspect ratio formats. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A method of processing a video signal wherein normal composite sync signal parameters of said video signal have been compromised by the introduction of extraneous sync signals into said video signal and normal DC levels of said composite synchronizing signal parameters have been compromised by the introduction of extraneous AGC pulses into said video signal whereby said normal composite sync signal parameters and said normal DC levels of said video signal are restored and regulated comprising the step of:
   receiving an input video signal;
   extracting a composite sync signal from said input video signal;
   providing reference points from within said composite sync signal;
   generating a plurality of composite sync signal portions in response to said providing step;
   wherein said composite sync signal portions are comprised of elements selected from the group consisting of sync pulse, back porch pulses and pulse-to-pulse intervals;
   logically processing said composite sync signal of said extracting step with said composite sync signal portions of said generating step using sequential logic operations;
   wherein said logically processing step produces a corrected composite sync signal;
   wherein said logically processing step produces a corrected inverted composite sync signal;
   wherein said logically processing step produces a pseudo sync signal of said extraneous sync signals;
   insertion of said corrected inverted composite sync signal into said video signal;
   removal of said pseudo sync signal from said input video signal;
   wherein said insertion step and said removal step are combined in a buffer step;
   whereby said buffer step produces a sync corrected video signal;
   generating a plurality of DC levels;
   generating a plurality of selection signals in response to said providing step;
   wherein only one signal of said selection signal is active at any one time;
   selection of a DC level from said DC levels in response to said one signal;
   generating a control signal representative of DC level dispersion of said normal DC levels in response to said providing step;
   electronic clamping of said sync corrected video signal to said DC level from said selection step in response to said control signal;
   whereby said electronic clamping produces an AGC/sync corrected video signal.

2. The method of claim 1 wherein said sequential logic operations are logic operations selected from the group consisting of AND, inverting, OR and exclusive OR.

3. The method of claim 1 wherein said input video signal is of a format selected from the group consisting of NTSC format, PAL format and SECAM format.

4. An apparatus that process a video signal wherein normal composite sync signal parameters of said video signal have been compromised by the introduction of extraneous sync signal signals into said video signal and normal DC levels of said composite sync signal parameters have been compromised by the introduction of extraneous AGC pulses into said video signal are restored and regulated, said apparatus comprising:
   a sync separator that extracts a pre-corrected composite sync signal from said video signal;
   a microcontroller that generates output signals wherein said output signals are selected from the group comprising a sync pulse signal, back porch signal, pulse-to-pulse interval signal and a gate signal;
   a reference generator that provides at least one reference signal to said microcontroller;
   a sync processor that processes said pre-corrected composite sync signal with said sync pulse signal, said back porch signal and said pulse-to-pulse interval signal to produce a corrected inverted composite sync signal and produce a pseudo sync signal;
   a sync inserter/stripper amplifier that inserts said corrected inverted composite sync signal into said video signal and strips said pseudo sync signal from said video signal producing a sync corrected video signal;
   a DC restored amplifier controlled by said gate signal that DC restores said sync corrected video signal to ground, producing an AGC/sync corrected video signal.

5. The apparatus of claim 4 wherein said sync processor contains logic gates selected from the group consisting of AND, inverting, OR and exclusive OR.

6. The apparatus of claim 4 wherein said video signal is of the format selected from the group consisting of NTSC format, PAL format and SECAM format.

7. The apparatus of claim 4 wherein said microcontroller and said sync processor regulate pulse duration, masking and timing, insertion of missing pulse, detection and/or insertion of pseudo sync pulses and the synthesis of sync pulse phase-shift of said pre-corrected composite sync signal.

* * * * *